(12) United States Patent
Jimenez (10) Patent No.: US 8,819,915 B2
(45) Date of Patent: Sep. 2, 2014

(54) PISTON PLATE CONNECTION WITH BLIND RIVETING AND METHODS THEREOF

(71) Applicant: Schaeffler Technologies AG & CO. KG, Herzogenaurach (DE)

(72) Inventor: Alfredo Jimenez, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/049,549

(22) Filed: Oct. 9, 2013

(65) Prior Publication Data

US 2014/0034442 A1  Feb. 6, 2014

Related U.S. Application Data

(62) Division of application No. 12/908,511, filed on Oct. 20, 2010.

(60) Provisional application No. 61/352,946, filed on Jun. 9, 2010, provisional application No. 61/253,181, filed on Oct. 20, 2009.

(51) Int. Cl.
*B21J 15/02* (2006.01)
*F16D 47/02* (2006.01)
*F16D 33/18* (2006.01)
*F16H 45/02* (2006.01)

(52) U.S. Cl.
CPC ............... *F16D 33/18* (2013.01); *B21J 15/02* (2013.01); *F16H 2045/0278* (2013.01); *F16H 45/02* (2013.01); *F16H 2045/021* (2013.01)
USPC .................... 29/525.06; 29/525.05; 192/3.29; 192/200

(58) Field of Classification Search
USPC ................. 192/3.21–3.33, 85.01–85.63, 200; 29/524.1, 525.06, 889, 889.5, 522.1, 29/525.05
See application file for complete search history.

(56) References Cited

U.S. PATENT DOCUMENTS

| | | | |
|---|---|---|---|
| 6,193,036 B1 | 2/2001 | Arhab et al. | |
| 6,334,521 B1 * | 1/2002 | Blard et al. | 192/70.252 |
| 6,688,441 B1 * | 2/2004 | Arhab et al. | 192/3.29 |
| 6,725,988 B2 | 4/2004 | Bauer et al. | |
| 6,736,247 B2 * | 5/2004 | Arhab et al. | 192/3.29 |
| 6,926,131 B1 * | 8/2005 | Arhab et al. | 192/3.29 |
| 7,938,239 B2 * | 5/2011 | Heck et al. | 192/3.28 |
| 8,051,964 B2 * | 11/2011 | Olsen et al. | 192/3.3 |
| 8,152,646 B2 * | 4/2012 | Jameson et al. | 464/68.7 |
| 8,225,916 B2 * | 7/2012 | Liang et al. | 192/3.29 |
| 8,328,647 B2 * | 12/2012 | Davis et al. | 464/100 |

(Continued)

FOREIGN PATENT DOCUMENTS

| | | | |
|---|---|---|---|
| JP | 2005-003095 | 1/2005 | |
| WO | WO 2007076760 A2 * | 7/2007 | F16H 45/02 |

*Primary Examiner* — Essama Omgba
(74) *Attorney, Agent, or Firm* — Kevin L. Parks; Kathryn A. Warner (57) ABSTRACT

A method of assembling a piston plate and cover for a torque converter comprising the steps of: installing a shimming leaf into the cover; installing a rivet comprising a rivet head and a rivet body into a piston plate hole; supporting the rivet head with the shimming leaf; and expanding the rivet body into the piston plate hole. The method includes a shimming leaf assembly, wherein the shimming leaf assembly comprises the shimming leaf and a pivot, wherein the shimming leaf is rotatable about the pivot.

12 Claims, 8 Drawing Sheets

(56) References Cited

U.S. PATENT DOCUMENTS

| | | | |
|---|---|---|---|
| 8,677,598 B2 * | 3/2014 | Lindemann et al. | 29/524.1 |
| 2003/0155199 A1 * | 8/2003 | Arhab et al. | 192/3.28 |
| 2007/0137962 A1 * | 6/2007 | Sturgin et al. | 192/3.29 |
| 2008/0060895 A1 * | 3/2008 | Heck et al. | 192/3.28 |
| 2008/0190723 A1 * | 8/2008 | Heck et al. | 192/3.29 |
| 2008/0277222 A1 * | 11/2008 | Olsen et al. | 192/3.21 |
| 2008/0277223 A1 * | 11/2008 | Liang et al. | 192/3.21 |
| 2009/0051087 A1 * | 2/2009 | Jameson et al. | 267/136 |
| 2009/0056323 A1 * | 3/2009 | Wolf et al. | 60/364 |
| 2009/0057089 A1 * | 3/2009 | Finley et al. | 192/70.18 |
| 2009/0084649 A1 | 4/2009 | Kombowski et al. | |
| 2010/0193314 A1 | 8/2010 | Zuehl et al. | |
| 2010/0197412 A1 * | 8/2010 | Davis et al. | 464/100 |
| 2011/0005880 A1 | 1/2011 | Carrier et al. | |
| 2011/0088992 A1 * | 4/2011 | Lindemann et al. | 192/30 R |
| 2012/0073279 A1 * | 3/2012 | Jimenez et al. | 60/364 |
| 2013/0056319 A1 * | 3/2013 | Lindemann et al. | 192/3.29 |
| 2014/0034442 A1 * | 2/2014 | Jimenez | 192/110 R |

* cited by examiner

PISTON PLATE CONNECTION WITH BLIND RIVETING AND METHODS THEREOF

CROSS-REFERENCE TO RELATED APPLICATIONS

This application is a divisional of application Ser. No. 12/908,511, filed on Oct. 20, 2010, which claims the benefit of U.S. Provisional Application No. 61/253,181 filed on Oct. 20, 2009 and U.S. Provisional Application No. 61/352,946 filed on Jun. 9, 2010, which applications are incorporated herein by reference.

FIELD OF THE INVENTION

The invention relates generally to a piston plate connection in a torque converter, and more specifically to a piston plate connection with blind riveting including a shimming leaf.

BACKGROUND OF THE INVENTION

U.S. Pat. No. 6,193,036 teaches a through hole in a piston or cover wall for fixing the piston to circumferential tabs. The holes are finally closed by shutters.

BRIEF SUMMARY OF THE INVENTION

Example aspects of the present invention broadly comprise a method of assembling a piston plate and cover for a torque converter comprising the steps of: installing a shimming leaf into the cover; installing a rivet comprising a rivet head and a rivet body into a piston plate hole; supporting the rivet head with the shimming leaf; and expanding the rivet body into the piston plate hole.

Other example aspects of the invention broadly comprise a method further including a shimming leaf assembly, wherein the shimming leaf assembly comprises the shimming leaf and a pivot, wherein the shimming leaf is rotatable about the pivot.

Other example aspects of the invention broadly comprise a method wherein the piston plate includes a piston plate bore, wherein outside diameter of the shimming leaf assembly is less than inside diameter of the piston plate bore.

Other example aspects of the invention broadly comprise a method further comprising the steps of rotating the shimming leaf about the pivot to place the shimming leaf in a release position and removing the shimming leaf through the piston plate bore.

Other example aspects of the invention broadly comprise a method wherein installing the rivet further includes clamping the rivet head between the piston plate and the shimming leaf, wherein the shimming leaf is supported by the cover.

Other example aspects of the invention broadly comprise a method of assembling a piston plate and cover for a torque converter wherein clamping the rivet further comprises axially deflecting the piston plate or the radially outermost portion of the cover.

Other example aspects of the invention broadly comprise a method wherein expanding the rivet body includes attaching a first end of a leaf spring to the piston plate.

Other example aspects of the invention broadly comprise a method further comprising the steps of attaching a second end of the leaf spring to the cover and connecting the second end of the leaf spring to the cover using a second rivet.

Other example aspects of the invention broadly comprise a method of assembling a piston plate and cover for a torque converter comprising the steps of: installing a shimming leaf into the cover; fastening a first end of a leaf spring to the cover with a first rivet extruded from the cover; installing a second rivet comprising a rivet head and a rivet body into a piston plate hole, located in a first portion of the piston plate, and a leaf spring hole, located in a second end of the leaf spring; supporting the second rivet head with the shimming leaf; and expanding the rivet body into the piston plate hole.

Other example aspects of the invention broadly comprise a method further including a shimming leaf assembly, wherein the shimming leaf assembly comprises the shimming leaf and a pivot, wherein the shimming leaf is rotatable about the pivot.

Other example aspects of the invention broadly comprise a method wherein the piston plate includes a piston plate bore, wherein outside diameter of the shimming leaf assembly is less than inside diameter of the piston plate bore.

Other example aspects of the invention broadly comprise a method further comprising the steps of rotating the shimming leaf about the pivot to place the shimming leaf in a release position and removing the shimming leaf through the piston plate bore.

Other example aspects of the invention broadly comprise a method further including shifting a first radially outermost portion of the piston plate or a first radially outmost portion of the cover in a first axial direction.

Other example aspects of the invention broadly comprise a method further including axially displacing the first portion of the piston plate and a radially outermost portion of the cover in the first axial direction so that the rivet head is clamped between the shimming leaf and the piston plate, wherein the shimming leaf is supported by the cover.

Other example aspects of the invention broadly comprise a removable shimming leaf assembly for connecting a piston plate to a cover in a torque converter comprising: a shimming leaf and a pivot, wherein the shimming leaf is rotatable about the pivot.

Other example aspects of the invention broadly comprise a removable shimming leaf assembly wherein the shimming leaf is rotatable about the pivot to a first position to support a rivet head in a piston plate hole and wherein the shimming leaf is further rotatable about the pivot to a second release position.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
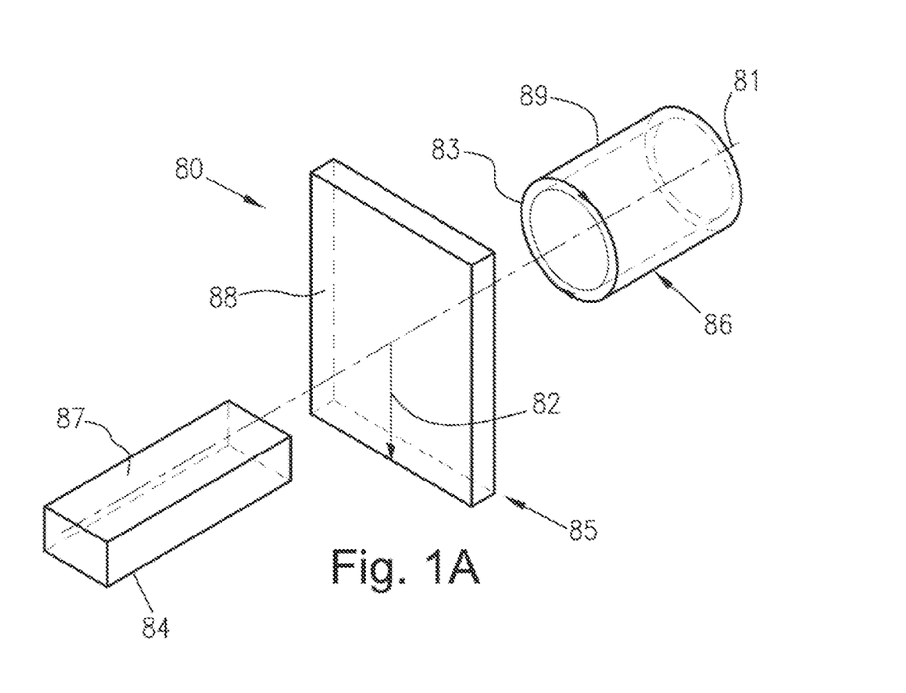
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
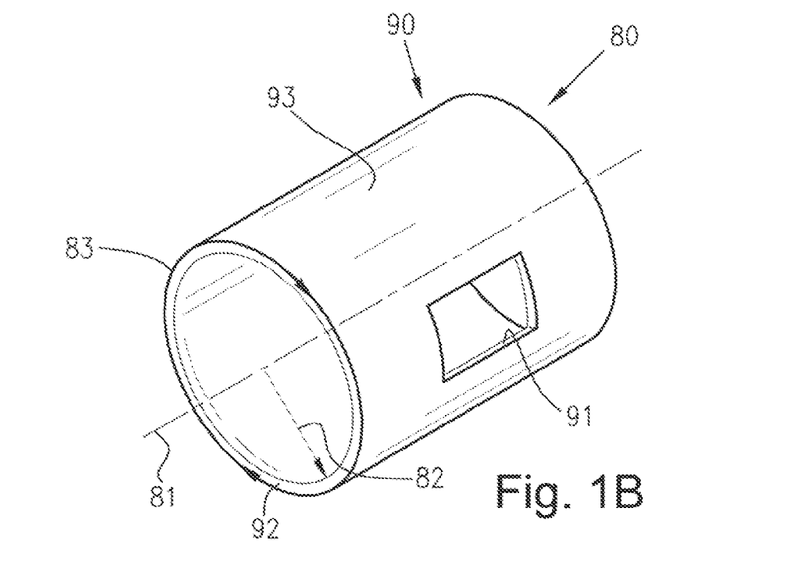
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figures 2, 3, 4:
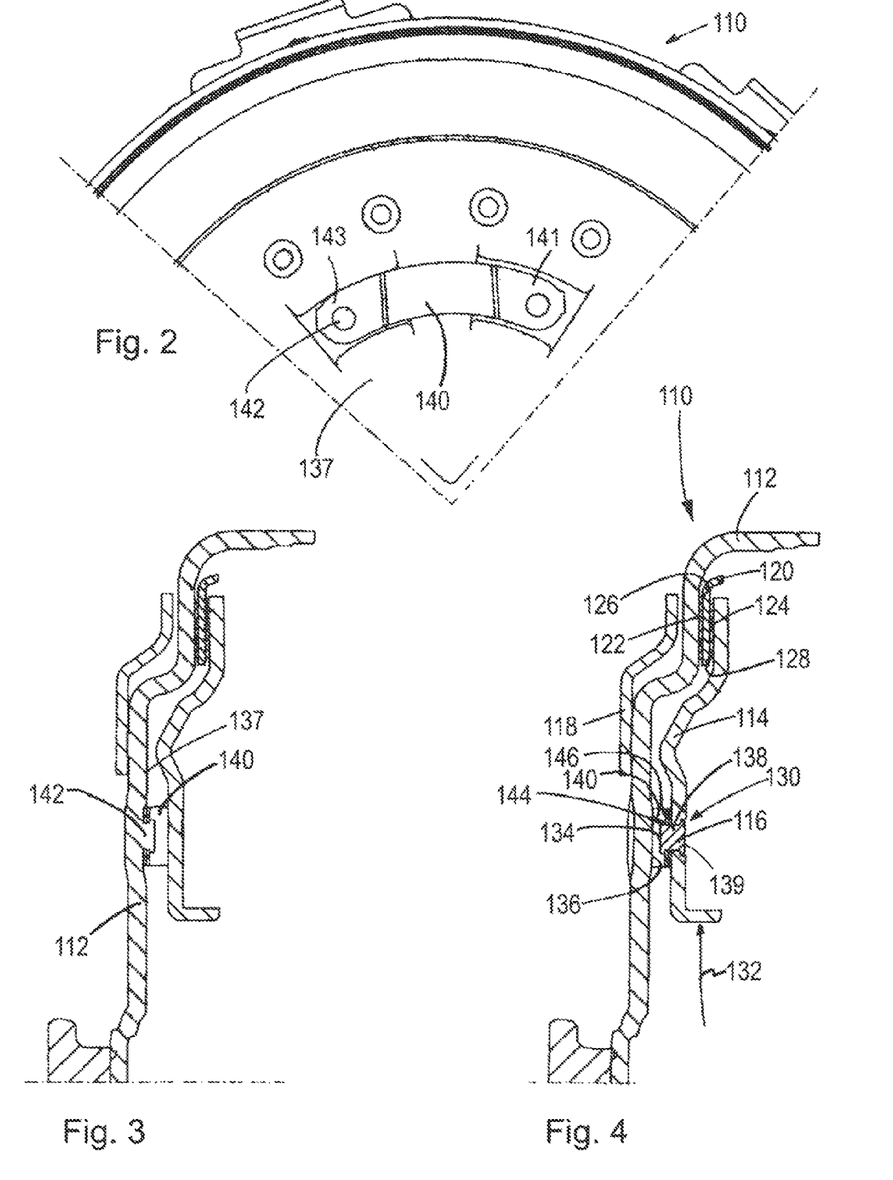
FIG. 2 is a front view of a clutch assembly with the piston plate removed for clarity, according to an example aspect of the invention.
FIG. 3 is a section view of the clutch assembly shown in FIG. 2 taken through a cover rivet.
FIG. 4 is a section view of the clutch assembly shown in FIG. 2 taken through a piston plate rivet.

The following description is made with reference to FIGS. 2-4. FIG. 2 is a front view of a clutch assembly with the piston plate removed for clarity, according to an example aspect of the invention. FIG. 3 is a section view of the clutch assembly shown in FIG. 2 taken through a cover rivet. FIG. 4 is a section view of the clutch assembly shown in FIG. 2 taken through a piston plate rivet. Clutch assembly 110 is a portion of a torque converter (not shown). The torque converter may also include a pump, turbine, and stator, as is commonly known in the art. Clutch assembly 110 includes cover 112, piston plate 114, and rivet 116. Cover 112 is drivingly engagable to a prime mover, such as a vehicle engine, through drive plate 118, for example.

Clutch assembly 110 may include drive ring 120 with friction rings 122 and 124 disposed adjacent to cover friction surface 126 and piston plate friction surface 128, respectively. Drive ring 120 may be drivingly connected with a damper (not shown) for the torque converter. The damper may, in turn, be drivingly connected with an input shaft of a vehicle transmission so that, when clutch assembly 110 is engaged, driving torque is transferred from the prime mover, through the clutch, and into the transmission.

Piston plate 114 includes hole 130. Hole 130 is generally disposed near inside diameter 132 of piston plate 114. Rivet 116 is disposed in hole 130. Head 134 of rivet 116 is proximate portion 136 of cover 112. Portion 136 may be a portion of radial wall 137 of cover 112. As described infra, cover 112 and/or piston plate 114 are deflectable to enable contact between cover 112 and rivet head 134 as pressure is applied to fix rivet 116 to piston plate 114. Pressure applied to rivet 116 radially expands shaft 138 forming expanded end 139 so that end 139 is larger than hole 130 of piston plate 116. In an example embodiment of the invention, portion 136 is a raised portion and rivet head 134 contacts cover raised portion 136 before rivet shaft 138 is expanded.

Clutch assembly 110 may include leaf spring 140. End 141 of leaf spring 140 is connected to piston plate 114 by rivet 116 (FIG. 4). In some example embodiments of the invention, end 143 of leaf spring 140 is connected to cover 112 (FIG. 3). In an example embodiment of the invention, cover 112 includes extruded rivet 142 and leaf spring 140 is connected to cover 112 by extruded rivet 142. In an example embodiment of the invention, leaf spring 140 is connected to cover 112 before leaf spring 140 is connected to piston plate 114, as described infra.

Leaf spring 140 may include a rivet head retaining portion (not shown) to retain rivet 116 in hole 144 of leaf spring 140. The retaining portion may include a tab extending from leaf spring 140 between cover portion 136 and rivet head 134 so that head 134 is retained between leaf spring surface 146 and the tab. In an example embodiment of the invention, cover 112 is deflectable to enable contact between cover 112 and the rivet head retaining portion. In an example embodiment of the invention, piston plate 114 is deflectable to enable contact between cover 112 and the rivet head retaining portion. In an example embodiment of the invention, piston plate 114 is axially deflectable to enable rivet head 134 to contact the rivet head retaining portion (not shown) and to enable the rivet head retaining portion to contact cover 112 before rivet shaft 138 is expanded. In an example embodiment of the invention, the rivet head retaining portion is for contacting cover raised portion 136 before rivet shaft 138 is expanded as described supra.

Figure 5A:
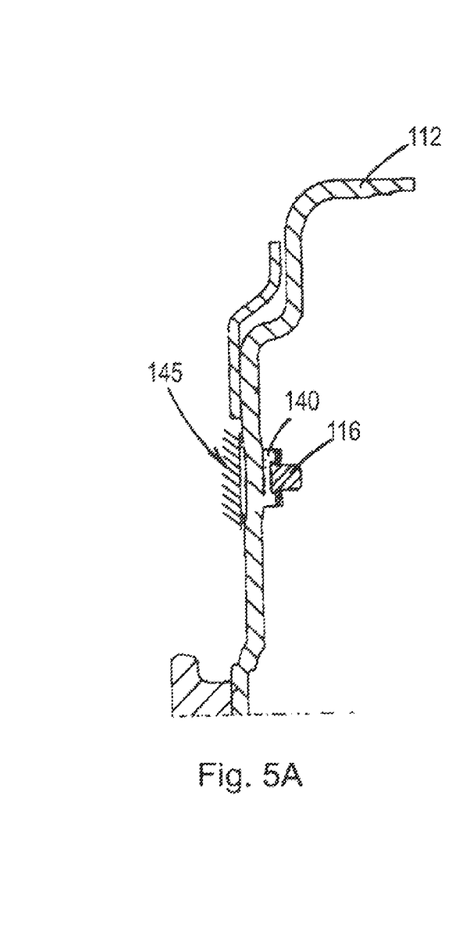
FIGS. 5A-5C illustrate a method of assembling a piston plate and a cover for a clutch assembly, according to an example aspect of the invention.
Figure 5B:
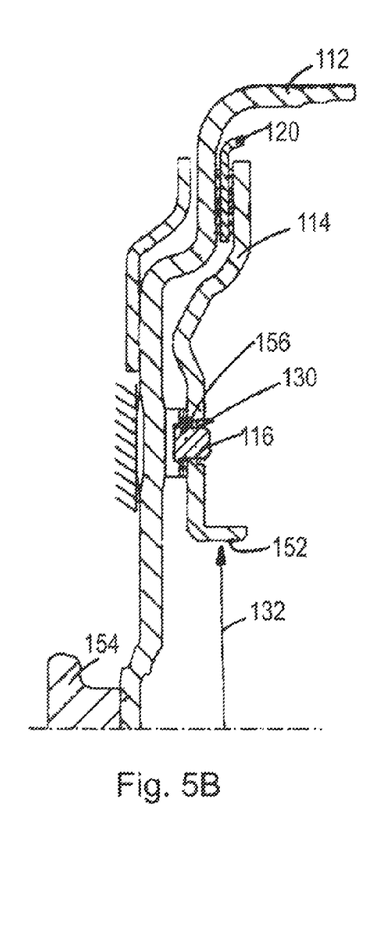
Figure 5C:
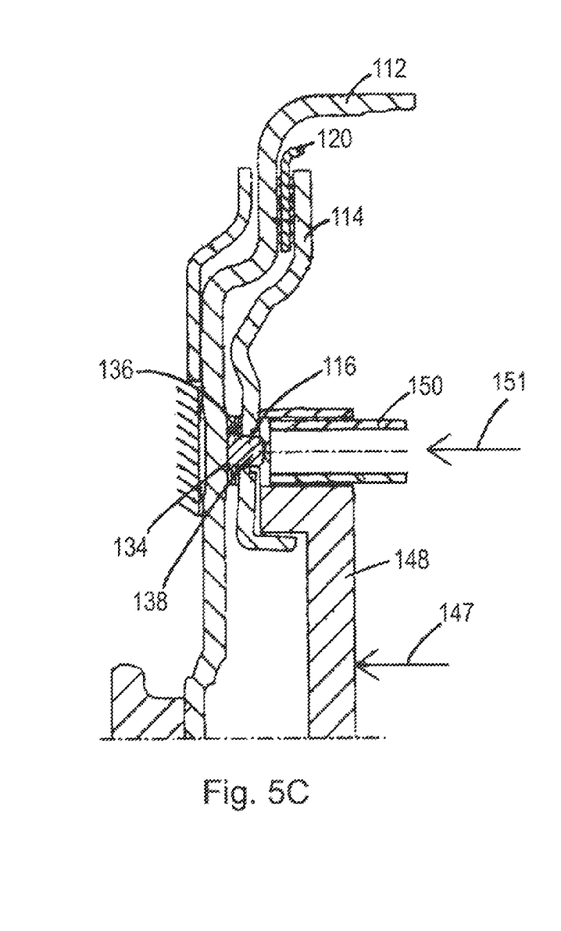

The following description is made with reference to FIGS. 5A through 5C. FIGS. 5A through 5C illustrate a method of assembling piston plate 114 and cover 112 for clutch assembly 110, according to an example aspect of the invention.

Although the method in FIGS. 5A through 5C is described as a sequence of steps for clarity, no order should be inferred from the sequence unless explicitly stated.

A first step, as shown in FIG. 5A, assembles rivet 116 to leaf spring 140 and leaf spring 140 to cover 112. Cover 112 is axially supported by a fixture represented by hatched area 145. A second step, as shown in FIG. 5B, positions drive ring 120 and piston plate 114 in cover 112. Rivet 116 is installed into piston plate hole 130. A third step, as shown in FIG. 5C axially deflects piston 114 in direction 147 with fixture 148 so that head 134 of rivet 116 is axially clamped between the cover and the leaf spring. Expanding tool 150 is positioned adjacent to body 138 of rivet 116 and is prepared to expand body 138 into piston plate hole 130. A fourth step (not shown) displaces tool 150 in direction 151 and expands body 138 into hole 130.

In some embodiments of the invention, head 134 contacts cover 112 during the expansion. In an example embodiment of the invention, cover includes raised portion 136 and the head 134 contacts portion 136 during the expansion. In an example embodiment of the invention, piston plate 114 includes bore 152 and cover 112 includes pilot 154, and the method involves the step of radially aligning piston plate bore 152 and cover pilot 154. In an example embodiment of the invention, the method includes the step of connecting leaf spring 140 to cover 112. In an example embodiment of the invention, leaf spring 140 includes hole 156 and the method includes the step of aligning leaf spring hole 156 to piston plate hole 130.

Figures 6, 7:
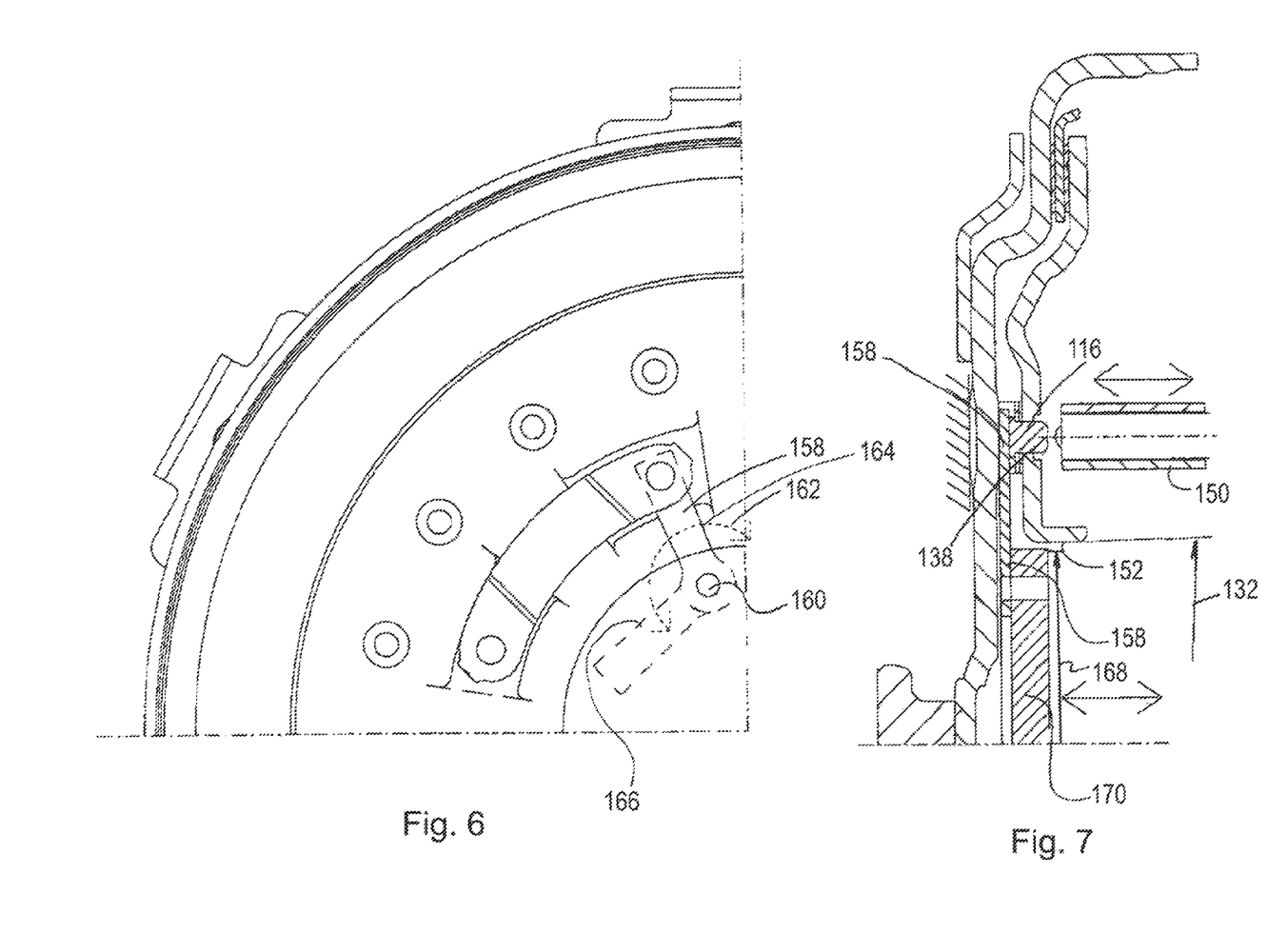
FIG. 6 is a front view of a clutch assembly with a shimming leaf installed and a piston plate removed for clarity, according to an example aspect of the invention.
FIG. 7 is a section view of the clutch assembly shown in FIG. 2 taken through a piston rivet.

The following description is made with reference to FIGS. 6-7. FIG. 6 is a front view of a clutch assembly with shimming leaf 158 installed and the piston plate removed for clarity, according to an example aspect of the invention. FIG. 7 is a section view of the clutch assembly shown in FIG. 2 taken through a piston rivet. Expanding tool 150 is positioned adjacent to body 138 of rivet 116 and is prepared to expand body 138 into piston plate hole 130.

In some embodiments of the invention, the method includes the step of supporting rivet head 134 with shimming leaf 158. That is, cover 112 supports shimming leaf 158 which, in turn, supports rivet head 134. Shimming leaf 158 is rotatable about pivot 160 in directions 162 as indicated by line 164 and line 166 in FIG. 6. As can be seen, when shimming leaf 158 is positioned as shown by line 166, outside diameter 168 of shimming leaf assembly 170 is less than inside diameter 132 of piston plate bore 152. In an example embodiment of the invention, the method includes the step of removing shimming leaf 158 through piston plate bore 152.

FIGS. 8A-8E illustrate a method of assembling piston plate 114 and cover 112 for clutch assembly 110, according to an example aspect of the invention. Although the method in FIGS. 8A through 8E is described as a sequence of steps for clarity, no order should be inferred from the sequence unless explicitly stated.

Figure 8A:
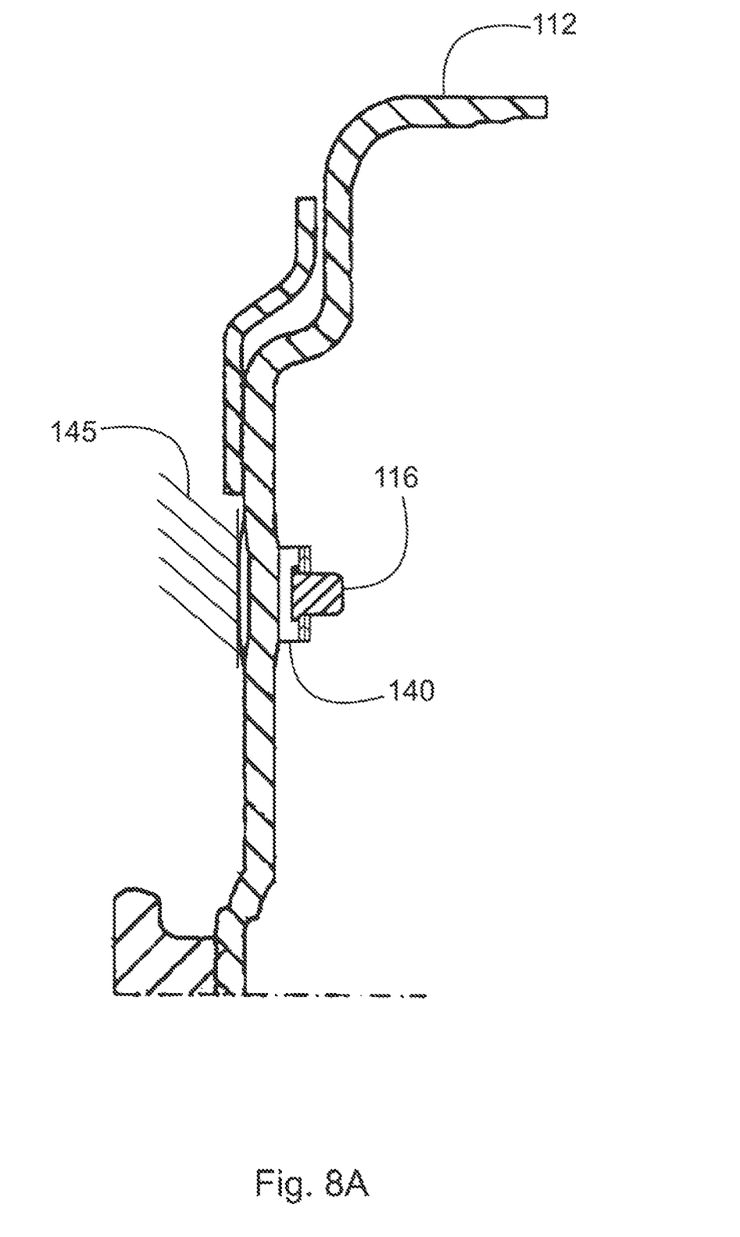
FIGS. 8A-8E illustrate a method of assembling a piston plate and a cover for a clutch assembly, according to an example aspect of the invention; and, FIG. 9 is a section view of a clutch assembly taken through a piston plate rivet.
Figure 8B:
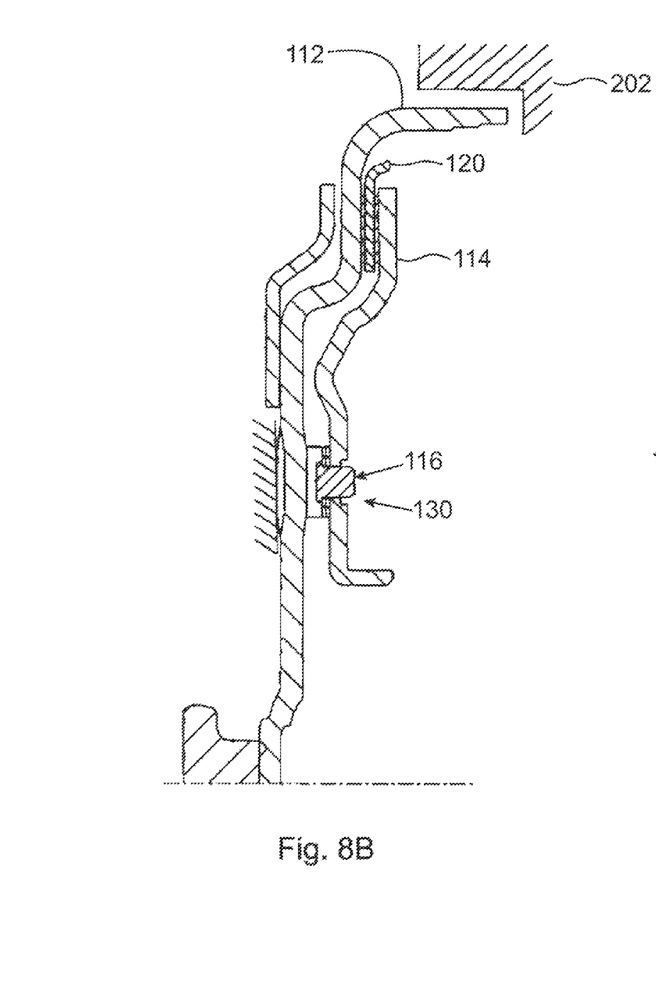
Figure 8C:
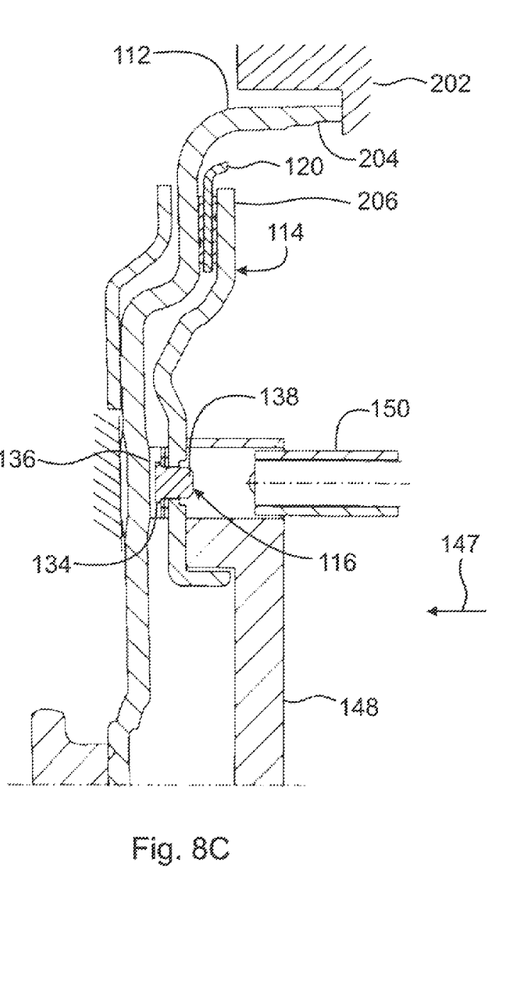
Figure 8D:
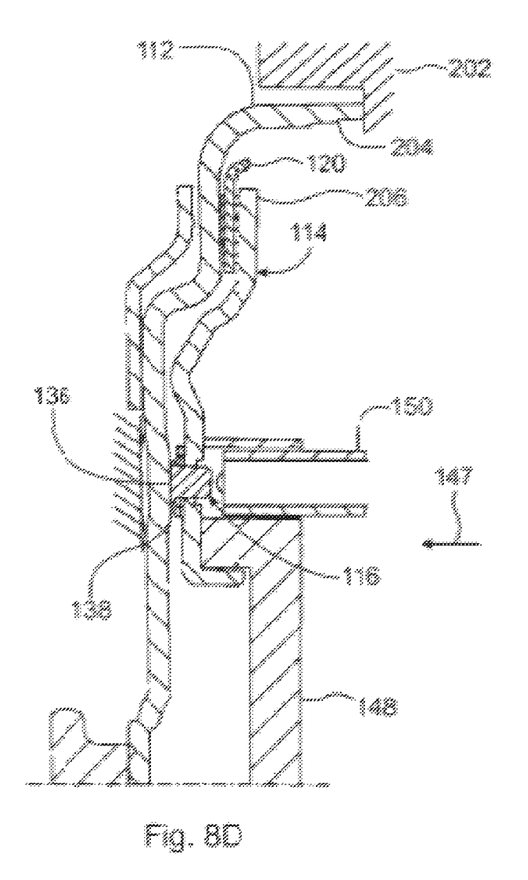
Figure 8E:
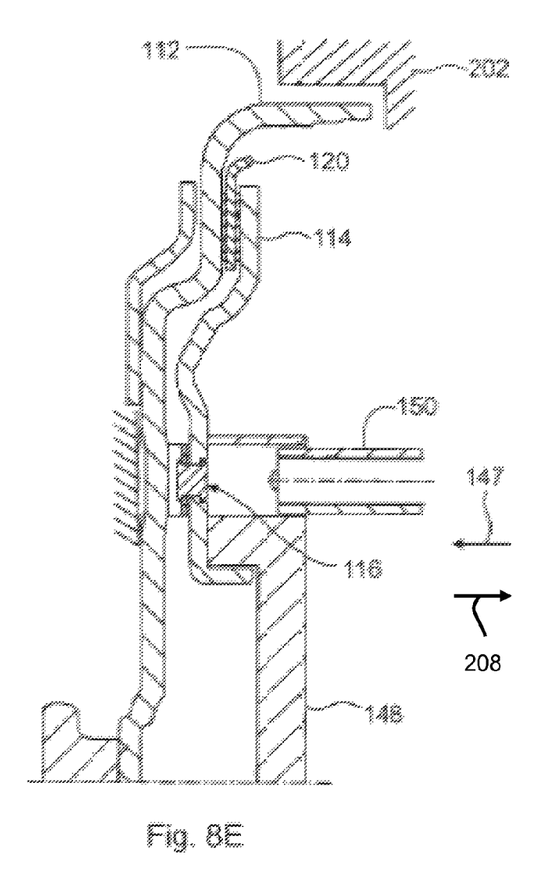

A first step, as shown in FIG. 8A, assembles rivet 116 to leaf spring 140 and leaf spring 140 to cover 112. Cover 112 is axially supported by a fixture represented by hatched area 145. A second step, as shown in FIG. 8B, positions drive ring 120 and piston plate 114 in cover 112. Rivet 116 is installed into piston plate hole 130. In a third step, as shown in FIG. 8C, fixture 202 begins to axially deflect radially outwardly disposed portion 204 of cover 112 in direction 147. As portion 204 moves, portion 206 of the piston plate is able to shift in direction 147 to track the displacement of portion 204. As part of the third step, fixture 148 is brought into contact with piston plate 114 and begins displacing the piston plate in direction 147. In one embodiment, the piston plate displaces in direction 147 without bending. In one embodiment, the piston plate bends as the plate is displaced in direction 147. In a fourth step, as shown in FIG. 8D, fixtures 202 and 148 continue displacing portion 204 and the piston plate, respectively, in direction 147 so that head 134 of rivet 116 is clamped between the cover and the leaf spring. Expanding tool 150 is positioned adjacent to body 138 of rivet 116 and is prepared to expand body 138 into piston plate hole 130. In one embodiment, the piston plate continues displacing in direction 147 without bending. In one embodiment, the piston plate bends as the plate is further displaced in direction 147. A fifth step, as shown in FIG. 8E, displaces tool 150 in direction 147 and expands body 138 into hole 130. After the body is expanded, fixtures 202 and 148 are displaced in direction 208.

Thus, the method shown in FIGS. 8A through 8E results in little or no bending of the piston plate during a riveting operation; or reduces the amount of bending of the piston plate during a riveting operation, for example, reducing the amount of bending of the piston plate associated with the method shown in FIGS. 5A through 5C.

In some embodiments of the invention, head 134 is clamped between cover 112 and the leaf spring during the expansion. In an example embodiment of the invention, the cover includes raised portion 136 and the head 134 is clamped between portion 136 and the leaf spring during the expansion. In an example embodiment of the invention, piston plate 114 includes bore 152 and cover 112 includes pilot 154, and the method involves the step of radially aligning piston plate bore 152 and cover pilot 154. In an example embodiment of the invention, the method includes the step of connecting leaf spring 140 to cover 112. In an example embodiment of the invention, leaf spring 140 includes hole 156 and the method includes the step of aligning leaf spring hole 156 to piston plate hole 130.

Figure 9:
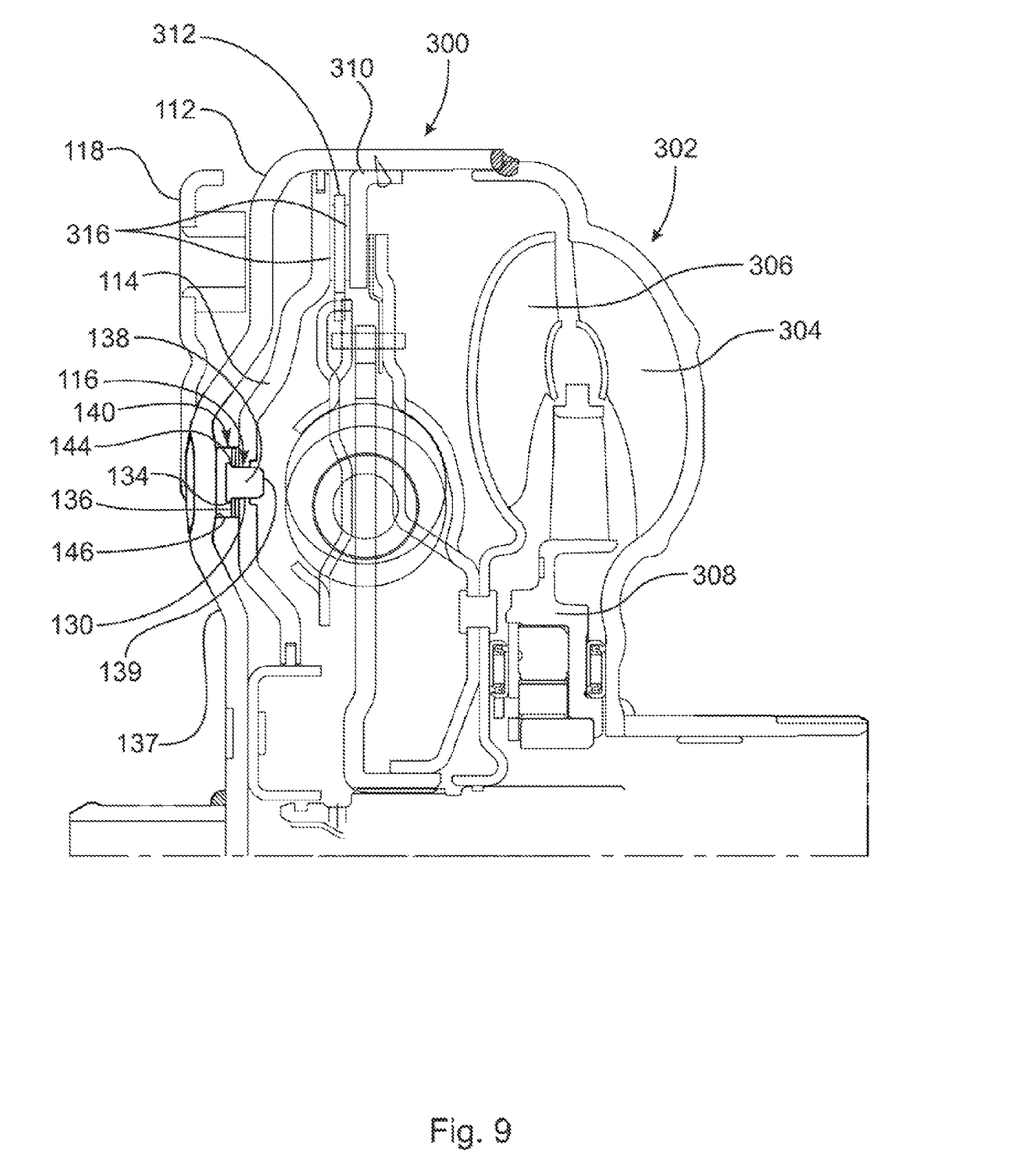

FIG. 9 is a section view of clutch assembly 300 taken through a piston plate rivet. Clutch assembly 300 is a portion of torque converter 302. The torque converter includes pump 304, turbine 306, and stator 308, as is commonly known in the art. Clutch assembly 300 includes cover 112, piston plate 114, and rivet 116. Cover 112 is drivingly engagable to a prime mover, such as a vehicle engine, through drive plate 118, for example.

Clutch assembly 300 includes drive ring 310, drivingly connected with cover 112, drive ring 312 drivingly connected to damper assembly 314, and friction rings 316. The friction rings can be disposed on or between rings 310 and 312 and plate 114. The damper is drivingly connected with an input shaft (not shown) of a vehicle transmission so that, when clutch assembly 300 is engaged, driving torque is transferred from the prime mover, through the clutch, and into the transmission.

Piston plate 114 includes hole 130. Rivet 116 is disposed in hole 130. Head 134 of rivet 116 is proximate portion 136 of cover 112. Portion 136 may be a portion of radial wall 137 of cover 112. As described infra, cover 112 is deflectable and/or piston plate 114 is displaceable to enable contact between cover 112 and rivet head 134 as pressure is applied to fix rivet 116 to piston plate 114. Pressure applied to rivet 116 radially expands shaft 138 forming expanded end 139 so that end 139 is larger than hole 130 of piston plate 116. In an example embodiment of the invention (not shown), portion 136 is a raised portion and rivet head 134 contacts cover raised portion 136 before rivet shaft 138 is expanded.

Clutch assembly 300 includes leaf spring 140. In one embodiment, leaf spring 140 is connected to piston plate 114 by rivet 116. In some example embodiments of the invention, leaf spring 140 is connected to cover 112, for example, as shown in FIG. 3. In an example embodiment of the invention, for example, as shown in FIG. 3, cover 112 includes an extruded rivet and leaf spring 140 is connected to cover 112 by the extruded rivet. In an example embodiment of the invention, leaf spring 140 is connected to cover 112 before leaf spring 140 is connected to piston plate 114.

In one embodiment (not shown), leaf spring 140 includes a rivet head retaining portion to retain rivet 116 in hole 144 of leaf spring 140. The retaining portion may include a tab extending from leaf spring 140 between cover portion 136 and rivet head 134 so that head 134 is retained between leaf spring surface 146 and the tab. In an example embodiment of the invention, cover 112 is deflectable to enable contact between cover 112 and the rivet head retaining portion. In an example embodiment of the invention, piston plate 114 is displaceable to enable contact between cover 112 and the rivet head retaining portion. In an example embodiment of the invention, piston plate 114 is axially displaceable to enable rivet head 134 to contact the rivet head retaining portion and to enable the rivet head retaining portion to contact cover 112 before rivet shaft 138 is expanded. In an example embodiment of the invention, the rivet head retaining portion is for contacting cover raised portion 136 before rivet shaft 138 is expanded as described supra.

Although clutch assembly 300 is shown connecting cover 112 to piston plate 114 with a particular number of leaf springs 140, assembly 300 may include other numbers of leaf springs 140. Furthermore, although specific piston plate attachments are shown, other components including drive plates, cover plates, and sealing plates may be attached to piston plate 114, and such attachments are within the scope of the invention.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What I claim is:

1. A method of assembling a piston plate and cover for a torque converter comprising the steps of:
    installing a shimming leaf assembly comprising a shimming leaf and a pivot, wherein the shimming leaf is rotatable about the pivot, into the cover;
    installing a rivet comprising a rivet head and a rivet body into a piston plate hole;
    supporting the rivet head with the shimming leaf; and
    expanding the rivet body into the piston plate hole.

2. The method of claim 1 wherein the piston plate includes a piston plate bore, wherein outside diameter of the shimming leaf assembly is less than inside diameter of the piston plate bore.

3. The method of claim 1 further comprising the steps of rotating the shimming leaf about the pivot to place the shimming leaf in a release position and removing the shimming leaf through the piston plate bore.

4. The method of claim 1 wherein installing the rivet further includes clamping the rivet head between the piston plate and the shimming leaf, wherein the shimming leaf is supported by the cover.

5. The method of claim 4 wherein clamping the rivet further comprises axially deflecting the piston plate or the radially outermost portion of the cover.

6. The method of claim 1 wherein expanding the rivet body includes attaching a first end of a leaf spring to the piston plate.

7. The method of claim 6 further comprising the steps of attaching a second end of the leaf spring to the cover and connecting the second end of the leaf spring to the cover using a second rivet.

8. A method of assembling a piston plate and cover for a torque converter comprising the steps of:
    installing a shimming leaf assembly comprising a shimming leaf and a pivot, wherein the shimming leaf is rotatable about the pivot, into the cover;
    fastening a first end of a leaf spring to the cover with a first rivet extruded from the cover;
    installing a second rivet comprising a rivet head and a rivet body into a piston plate hole, located in a first portion of the piston plate, and a leaf spring hole, located in a second end of the leaf spring;
    supporting the second rivet head with the shimming leaf; and
    expanding the rivet body into the piston plate hole.

9. The method of claim 8 wherein the piston plate includes a piston plate bore, wherein outside diameter of the shimming leaf assembly is less than inside diameter of the piston plate bore.

10. The method of claim 8 further comprising the steps of rotating the shimming leaf about the pivot to place the shimming leaf in a release position and removing the shimming leaf through the piston plate bore.

11. The method of claim 8 further includes shifting a first radially outermost portion of the piston plate or a first radially outmost portion of the cover in a first axial direction.

12. The method of claim 11 further includes axially displacing the first portion of the piston plate and a radially outermost portion of the cover in the first axial direction so that the rivet head is clamped between the shimming leaf and the piston plate, wherein the shimming leaf is supported by the cover.

* * * * *